US011657397B2

(12) United States Patent
Vargas et al.

(10) Patent No.: US 11,657,397 B2
(45) Date of Patent: May 23, 2023

(54) INTEGRATED FRAUD DETECTION USING LIGHT SENSORS

(71) Applicant: Capital One Services, LLC, McLean, VA (US)

(72) Inventors: Cruz Vargas, Denver, CO (US); Bryant Yee, Washington, DC (US); Joshua Peters, Charlottesville, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/392,701

(22) Filed: Aug. 3, 2021

(65) Prior Publication Data

US 2023/0042320 A1 Feb. 9, 2023

(51) Int. Cl.
*G06Q 20/40* (2012.01)
*G06N 20/00* (2019.01)
*G06K 7/00* (2006.01)
*G06K 7/08* (2006.01)

(52) U.S. Cl.
CPC ......... *G06Q 20/401* (2013.01); *G06K 7/0091* (2013.01); *G06K 7/08* (2013.01); *G06N 20/00* (2019.01)

(58) Field of Classification Search
CPC .... G06Q 20/401; G06N 20/00; G06K 7/0091; G06K 7/08

USPC .......................................................... 705/44
See application file for complete search history.

(56) References Cited

U.S. PATENT DOCUMENTS

| 8,892,461 | B2 | 11/2014 | Lau et al. |
| 10,657,520 | B2 | 5/2020 | Zarakas et al. |
| 2013/0085887 | A1 | 4/2013 | Zhang |
| 2014/0263624 | A1 | 9/2014 | Guillaud |
| 2022/0076236 | A1* | 3/2022 | Bodalia ............... G06K 7/1417 |
| 2022/0138755 | A1* | 5/2022 | Aument ............... G06Q 20/204 |
| | | | 726/26 |

* cited by examiner

*Primary Examiner* — Lindsay M Maguire
*Assistant Examiner* — Bernadine Lothery
(74) *Attorney, Agent, or Firm* — Banner & Witcoff, Ltd.

(57) ABSTRACT

Aspects described herein may allow for detecting fraudulent transaction requests using light sensors on smartcards. A computing device may receive, from a terminal, a request to approve a transaction. The request may comprise a timestamp corresponding to a time when the transaction was requested, a transaction type associated with the transaction, and an identification of a card associated with the transaction. The computing device may also receive, from one or more light sensors associated with the card, light data. The light data indicates an amount of ambient light during a time period when the transaction was requested. The computing device may determine, based on the transaction type, a model of expected ambient light. If the light data corresponds to the model, the computing device may send, based on the determination that the light data corresponds to the model, an approval of the request.

20 Claims, 5 Drawing Sheets

INTEGRATED FRAUD DETECTION USING LIGHT SENSORS

FIELD OF USE

Aspects of the disclosure relate generally to data processing, and hardware and software related thereto. More specifically, aspects of the disclosure may provide systems and methods for integrated fraud detection using light sensors.

BACKGROUND

Credit card thieves cause billions of dollars of loss every year by making fraudulent transactions unauthorized by the users of the credit cards. For example, a credit card thief may obtain the account information (e.g., user identification, password, etc.) associated with a user and create a counterfeit credit card. The counterfeit credit card may be used to make fraudulent transactions in various situations. For example, a counterfeit credit card may be used at a point of sale machine to make a purchase. Systems and methods for detecting fraudulent transactions are therefore needed.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Detecting fraudulent transactions may bring challenges because if a thief has created a counterfeit debit or credit card with the correct user's account information (e.g., account identification, password, etc.), the transaction request made by the counterfeit card may be difficult for a system to detect. In other words, the system may not know whether the transaction request is made by the user or by an unauthorized third party. By using one or more light sensors coupled with or attached to the user's card as may be described herein, the system may determine that during the time period while a transaction is made, whether ambient light the card is exposed to corresponds to ambient light patterns expected under the particular circumstance. Ambient light that does not correspond to expected patterns may indicate the transaction is fraudulent. In this way, some fraudulent transactions may be detected.

Aspects discussed herein may provide a computer-implemented method for detecting fraud in transactions associated with a physical card by using light sensors on the card. For example, in at least one implementation, a computing device may receive, from a terminal, a request to approve a transaction. The request may comprise a timestamp corresponding to a time when the transaction was requested, a transaction type associated with the transaction, and an identification of a card associated with the transaction. The computing device may receive, from one or more light sensors associated with the card, light data. The light data may indicate an amount of ambient light during a time period comprising the time when the transaction was requested. The computing device may determine, based on the transaction type, a model of expected ambient light associated with the transaction type and then determine whether the light data corresponds to the model. If the light data corresponds to the model, the computing device may send, based on the determination that the light data corresponds to the model, an approval of the request.

In some instances, the computing device may determine that the light data corresponds to the model by determining an amount of light detected by a first light sensor associated with a first portion of the card at a time based on the timestamp and determining an amount of light detected by a second light sensor associated with a second portion of the card at the time based on the timestamp. If a difference between the amount of light detected by the first light sensor and the amount of light detected by the second light sensor exceeds a threshold, the computing device may determine that the light data corresponds to the model. For example, the terminal may be a contactless payment terminal, and wherein the first light sensor and the second light sensor detect light on opposite sides of the card.

In some instances, the time period may start based on a change of light exceeding a threshold.

In some instances, the transaction type may indicate the transaction was initiated by one of: the card being presented in close proximity to a contactless payment reader on the terminal; the card being swiped through a magnetic stripe reader on the terminal; or a portion of the card being inserted into a chip reader on the terminal.

In some instances, the light data further indicates a change of ambient light over the time period.

In some instances, determining the light data corresponds to the model may comprise: determining the card was exposed to light emitted from a display device at a time based on the timestamp.

In some instances, the model may be determined further based on a location of the terminal, the timestamp, and/or a data set indicating a habit of a user associated with the card.

In some instances, the light data may be received from the one or more light sensors via a mobile device in communication with the card.

In some instances, the computing device may further obtain, from a database, a training data set comprising a plurality of training light data associated with prior transactions of the transaction type, update the training data set by adding the light data to the training data set, and update the model based on the updated training data set.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to systems, methods, techniques, apparatuses, and non-transitory computer-readable media for determining network membership.

Before discussing these concepts in greater detail, however, several examples of a computing device that may be used in implementing and/or otherwise providing various aspects of the disclosure will first be discussed with respect to FIG. 1.

Figure 1:
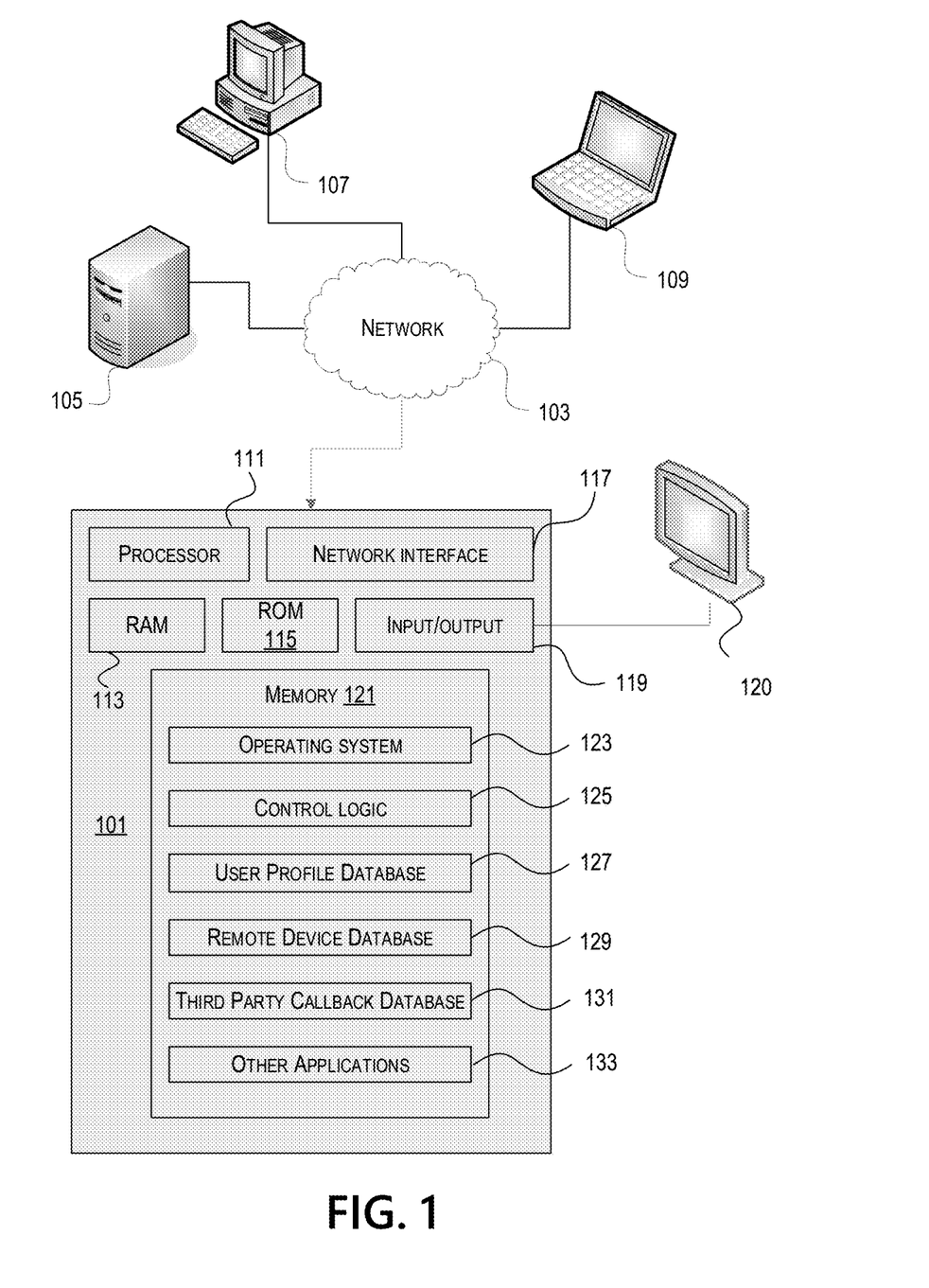
FIG. 1 depicts an example of a computing device in accordance with one or more aspects described herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smartphone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associating detecting triggering event, authenticating messages, performing third-party callbacks, and/or other functions described herein. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling the overall operation of the computing device 101, control logic 125 for instructing computing device 101 to perform aspects discussed herein. Furthermore, memory 121 may store various databases and applications depending on the particular use, for example, user profile database 127, remote device database 129, third-party callback database 131, and other applications 133 may be stored in a memory of a computing device used at a server system that will be described further below. Control logic 125 may be incorporated in and/or may comprise a linking engine that updates, receives, and/or associates various information stored in the memory 121 (e.g., user identifiers, remote device identifiers, third-party associated information, authentication information, etc.). In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer-executable instructions may be stored on a computer-readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field-programmable gate arrays (FPGA), and the like. Particular data structures may be used to more effectively implement one or more aspects discussed herein, and such data structures are contemplated within the scope of computer-executable instructions and computer-usable data described herein. Various aspects discussed herein may be embodied as a method, a computing device, a data processing system, or a computer program product.

Figure 2:
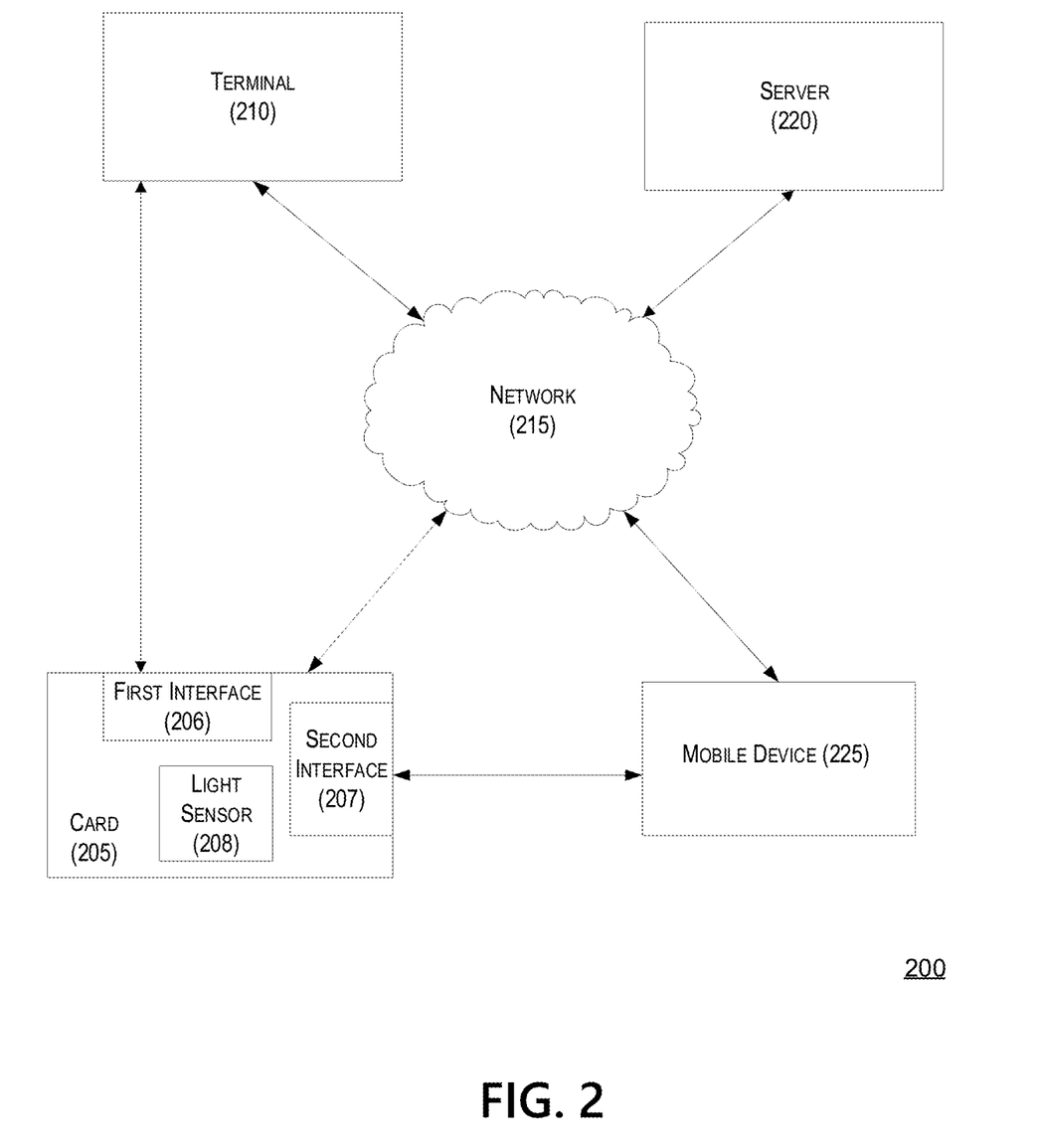
FIG. 2 depicts an example of a computing environment in which one or more aspects described herein may be implemented.

FIG. 2 depicts a computing environment 200 in which one or more aspects described herein may be implemented. Referring to FIG. 2, computing environment 200 may include one or more computer systems. For example, computing environment 200 may include a card 205, a mobile device 225, a terminal 210, and a server 220. Each of the card 205, the mobile device 225, the terminal 210 and the server 220 may comprise one or more computing devices 101 in FIG. 1.

The card 205 may be a smart card configured to provide authentication, data storage, and application processing. For example, the card 205 may be a bank card (e.g., a credit card, a debit card), a stored value card, an identification card, etc. The card 205 may be used to initiate transactions of various types. For example, the transaction may be a payment made from an account associated with the card 205 to another party (e.g., a merchant), an authentication (e.g., to enter a building or log in to a computing system), and/or any other type of transactions. The card 205 may be a card 300 depicted in FIG. 3.

The card 205 may comprise one or more first interfaces 206 configured to communicate with the terminal 210. As described below, the first interface 206 may comprise a magnetic stripe 305, a chip 310, and/or a near-field communication (NFC) transmitter 315. The first interface 206 may be used to be coupled with the terminal 210. For example, the terminal 210 may have an interface that corresponds to the first interface 206 on the card 205 in order to read data (e.g., personal identification information of the user, authentication information) from the card 205. For example, the terminal 210 may have one or more of magnetic stripe readers, chip readers, and/or contactless payment readers. For example, the terminal 210 may be a point-of-sale (POS) machine or a point-of-purchase (POP) machine. The terminal 210 may be configured to send transaction requests associated with the card 205 to the server 220 for approval.

The card 205 may also comprise one or more light sensors 208 configured to collect light data as described herein. Each of the one or more light sensors 208 may be located at a particular location associated with the card 205 and may be configured to detect ambient light the card 205 is exposed to around that particular location, as described in further detail below.

The card 205 may also comprise one or more second interfaces 207 configured to communicate with one or more mobile devices 225. For example, the second interface 207 may be an NFC interface (e.g., an RFID transmitter) or a Bluetooth transmitter. As may be described below, the second interface 207 may be configured to transmit data (e.g., light data) to the mobile device 225. The mobile device 225 may be associated with a user of the card 205. The light data may be sent by the mobile device 225 to the server 220 to authenticate the transaction. Alternatively, the second interface 207 may comprise a network interface (e.g., a 5G network interface) configured to communicate with the server 220 via the network 215. The light data may be sent to the server 220 via the second interface 207. The first interface 206 and the second interface 207 may be the same interface or may be different interfaces.

The network 215 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 1.

The server 220 may be configured to authenticate transaction requests from the terminal 210 as described herein. The authentication may be based on the light data detected by the light sensors 208. The server 220 may store a variety of authentication data, such as the users' account profile associated with the card 205, authentication information (e.g., passwords, authentication tokens, etc.). The server 220 may also be configured to store one or more models as described herein in order to authenticate the light data. The server 220 may be a computing system independent from the terminal 210 and/or the mobile device 225, or the server 210 may be a computing component within the terminal 210 and/or the mobile device 225.

The data transferred to and from various computing devices in computing environment 200 may include secure and sensitive data, such as confidential documents, customer personally identifiable information, and account data. Therefore, it may be desirable to protect transmissions of such data using secure network protocols and encryption, and/or to protect the integrity of the data when stored on various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the computing environment 200. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the computing environment 200 in front of one or more computing devices such that any external devices may communicate directly with the specialized hardware.

Figure 3:
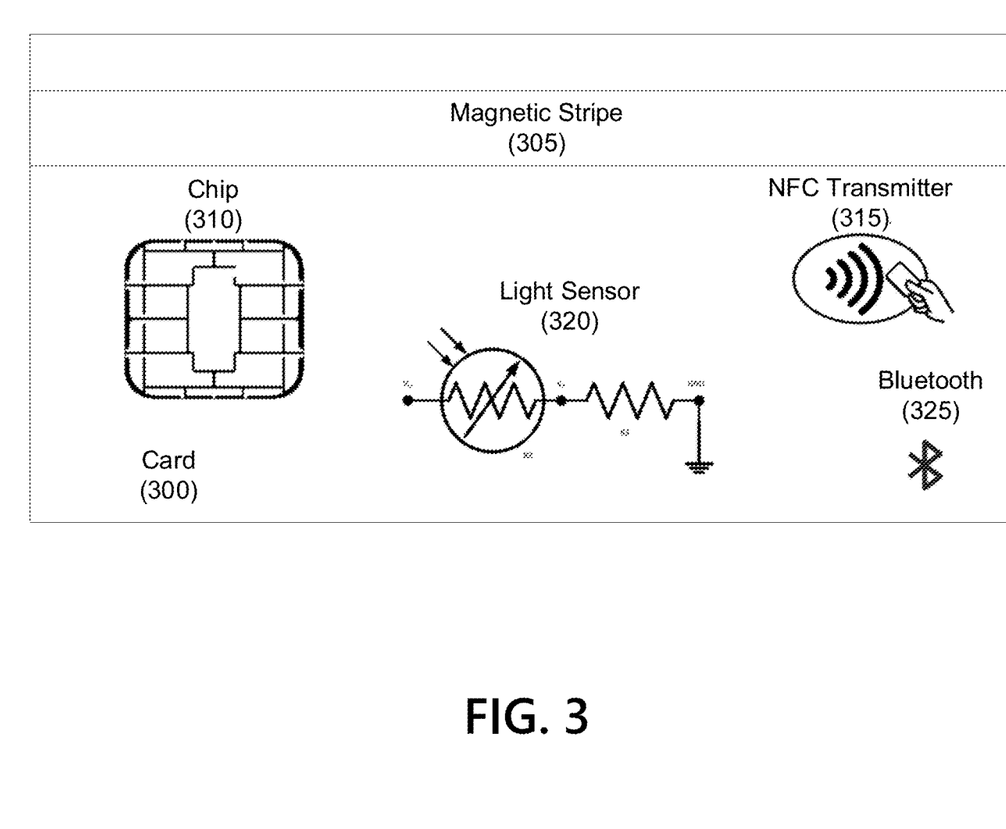
FIG. 3 depicts an example of a card in accordance with one or more aspects discussed herein.

FIG. 3 depicts an example of a card 300 in accordance with one or more aspects discussed herein. The card 300 may be the card 205 depicted in FIG. 2, and may comprise one or more computing devices 101 depicted in FIG. 1.

The card 300 may comprise one or more magnetic stripes 305, chips 310, NFC transmitters 315, Bluetooth transmitters 325. The card 300 may also comprise one or more light sensors 320. The one or more magnetic stripes 305, chips 310, and/or NFC transmitters 315 may be the first interfaces 206 depicted in FIG. 2 and may be configured to communicate with one or more terminals 210. The Bluetooth transmitter 325 may be the second interfaces 207 depicted in FIG. 2 and may be configured to communicate with the mobile device 225 depicted in FIG. 2. It is appreciated that other types of first interfaces 206 and/or second interfaces 207 are possible.

The light sensor 320 may comprise a photocell circuit as depicted in FIG. 3, but other types of light sensors 320 are possible. More than one light sensor may be located in different locations on the card 300 and be configured to detect ambient light around different portions of the card 300.

Figure 4:
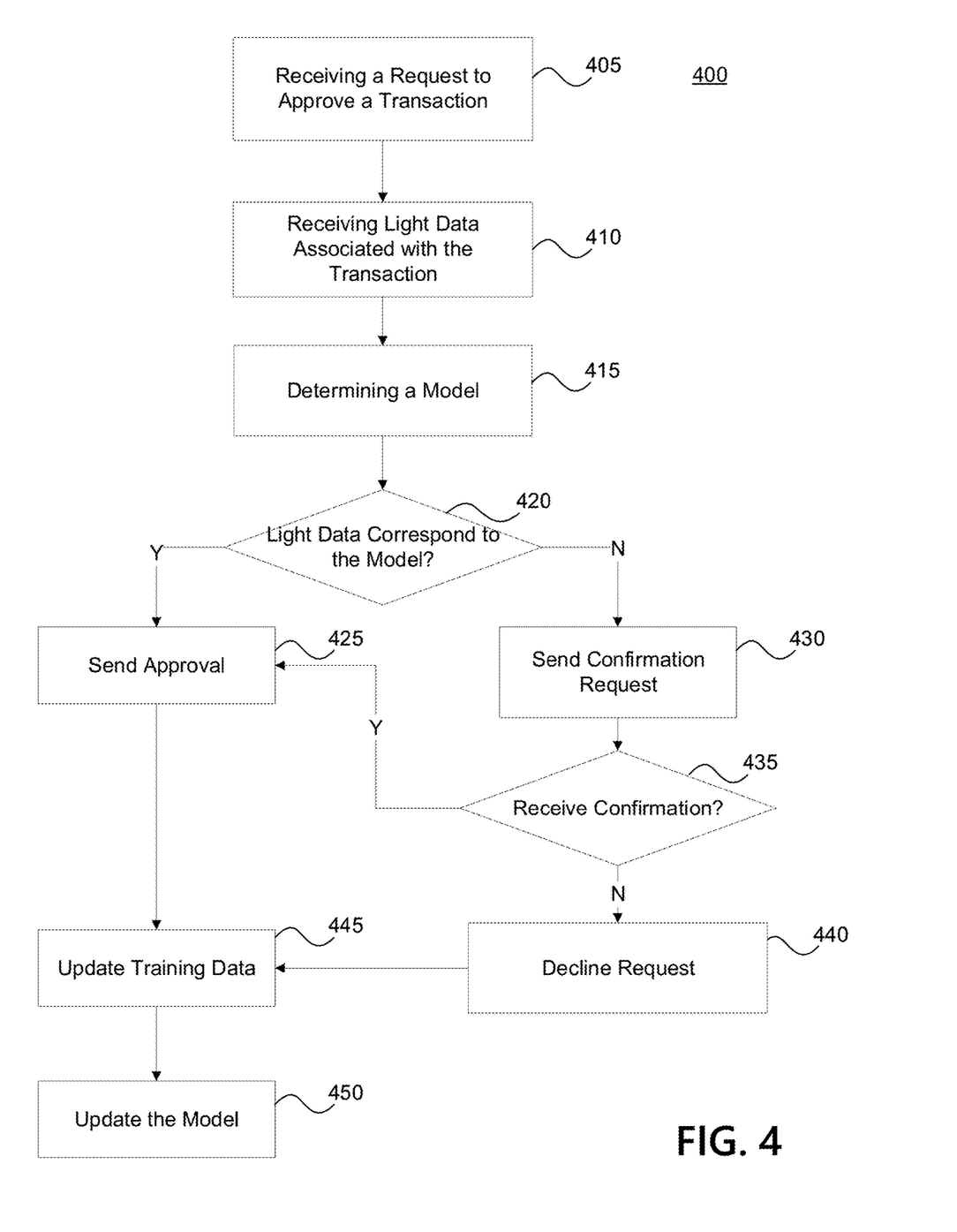
FIG. 4 depicts a flow diagram of an example method for detecting fraud in accordance with one or more aspects discussed herein.

FIG. 4 depicts a flow diagram of an example method 400 for detecting fraud. Some or all of the steps of method 400 may be performed using a system that comprises one or more computing devices as described herein, including, for example, computing device 101, card 205, terminal 210, server 220, and mobile device 225 in FIG. 2, or the card 300 in FIG. 3.

At step 405, the system (e.g., the server 220) may receive, from a terminal 210, a request to approve a transaction. The request may comprise a timestamp corresponding to a time when the transaction was requested, a transaction type associated with the transaction, and an identification of a card 300 associated with the transaction.

The card 300 may store information (e.g., account information, authentication information, and/or identification (ID) information of the card 300). The transaction may be initiated by a communication between the terminal 210 and the card 300. Data stored in the card 300 may be read by the terminal 210 via the first interfaces 206. For example, the transaction may be initiated by the magnetic stripe 305 on the card 300 being swiped through a magnetic stripe reader on the terminal 210. The transaction may be initiated by a portion of the card 300 comprising the chip 310 being inserted into a chip reader on the terminal 210. The transaction may be initiated by the card 205 being presented in close proximity to a contactless payment reader (e.g., NFC, RFID) on the terminal 210. A transaction type may indicate the method used to initiate the transaction.

The timestamp may be recorded by the terminal 210. The timestamp may correspond to the time at which the terminal 210 communicated with the card 300 (e.g., the time when the terminal 210 reads data from at least one of the magnetic stripe 305, the chip 310, or the NFC transmitter 315).

The request may request a payment be made from an account associated with the card 300 to an account associated with the terminal 210, performance of a certain operation on a user's account (e.g., deposit a certain amount of money in the user's account), entry into a building associated with the terminal 210, login access to a computing system associated with the terminal 210, or any other type of transactions.

For example, the card 300 may be a credit or debit card associated with a user. The terminal 210 may be a POS machine in a coffee store. The transaction request may be a request to make a certain amount of payment from the user's account to the coffee store's account. In another example, the card 300 may be a fob, and the terminal 210 may be associated with a lock on a door. The transaction request may be a request to open the door so that the user may enter a building.

The terminal 210 may send the transaction request comprising the timestamp, the transaction type, and/or any other information associated with the transaction to the server 220 for approval of the request.

At step 410, the system (e.g., the server 220) may receive, from one or more light sensors 320 associated with the card 300, light data. The light data may indicate an amount of ambient light during a time period comprising the time when the transaction was requested.

Figure 5A:
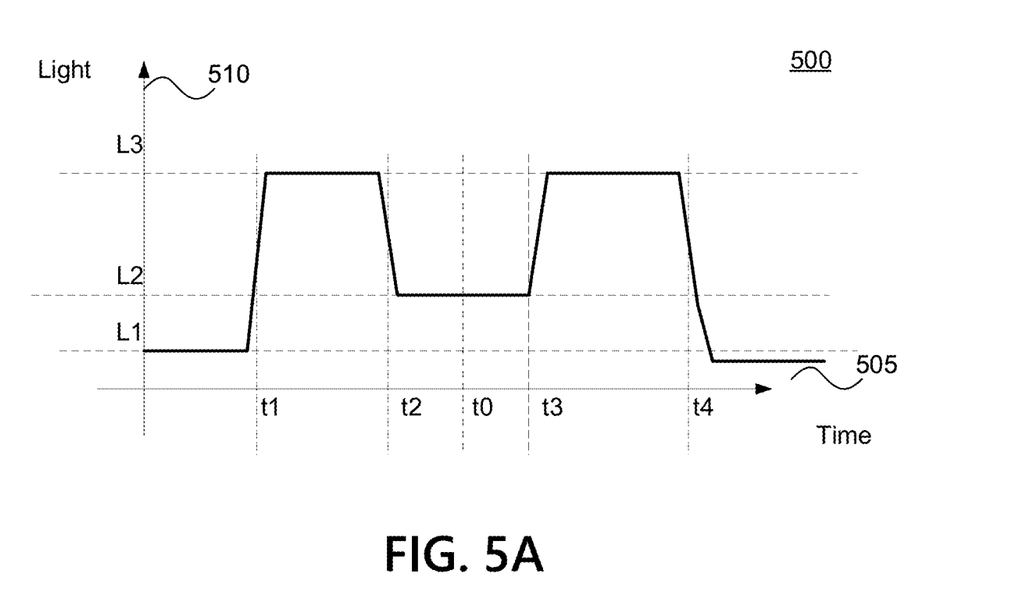
FIG. 5A and FIG. 5B depict exemplary light data models in accordance with one or more illustrative aspects discussed herein.

FIG. 5A may show an example of a graph indicating the light data detected by a first light sensor 320. The first light sensor 320 may be located in a location proximate to a portion of the first interface 206 that is used at the time the transaction was initiated. For example, if the transaction type is to insert the chip 310 into a chip reader of the terminal 210, the first light sensor 320 may be located in proximity with the chip 310. In FIG. 5A, the x axis 505 represents the current time, while the y axis 510 represents the amount of light. Before time t1, the card 300 may be in the user's wallet and therefore the amount of ambient light around the first light sensor 320 may be low. As shown in FIG. 5A, the amount of ambient light is L1 until time t1. At time t1, the user may bring the card 300 out of the wallet to make a payment by using the card 300. The amount of ambient light increases, from L1 to L3. At time t2, the user may insert the chip 310 into a chip reader on the terminal 210. The first light sensor 320 that is proximate to the chip 310 may also be inserted into the chip reader. At time t2, the amount of ambient light decreases from L3 to L1, because the amount of light detected by the first light sensor 320 decreases when a portion of the chip 310 including the first light sensor 320 is inside the chip reader, and exposed to minimal light. At time t3, the communication between the card 300 and the terminal 210 may be completed and the user may be instructed to remove the card 300 from the chip reader. The ambient light then increases to L3 again. At time t4, the user may put the card 300 back into his wallet again and the ambient light after time t4 decreases to L1 again. In this example, the transaction request may be made at a time between t2 and t3 (e.g., at time t0).

The light data may be sent from the card 300 to the server 220. As described above in FIG. 2, the card 300 may comprise a Bluetooth transmitter 325 that is configured to communicate with a mobile device 225 associated with the user of the card 300. The light data may be sent to the mobile device 225 via the Bluetooth transmitter 325. The mobile device 225 may forward the light data (with or without further processing of the light data) to the server 220. This may be useful if the card 300 comprises relatively less processing capacity and/or energy to communicate with devices remotely, and the mobile device 225 comprises relatively more processing capacity and/or energy to communicate devices remotely. The mobile device 225 may be in the user's wallet while the transaction was made, and therefore may be able to communicate with the card 300 via near-field communication to receive the light data. Alternatively, the card 300 may comprise a network interface configured to directly send the light data to the server 220 via the network 215. For example, the network interface may be a 5G network interface communicating with a 5G base station of the network 215.

The card 300 may send light data detected during a time period comprising the time when the transaction was requested (e.g., comprising the time t0 as may be shown in FIG. 5A). The beginning and the ending of the time period may be determined by the need of the server 220.

In some examples, the time period may start based on a change of light exceeding a threshold. Consistent with the example in FIG. 5A, the time period may start at time t1 based on a change of light from L1 to L3 exceeding a threshold. This may be useful since the light data after the card 300 is taken out of the wallet may start to be relevant to the transaction. The first light sensor 320 may be triggered, by the change of light exceeding a threshold, to change from a standby mode to an active mode at time t1.

In other examples, the time period may start at a time point (e.g., 5 minutes) before the time the transaction was requested. The first light sensor 320 may keep detecting light whether the card 300 is out of the wallet or not, and store some of the light data on the card 300. While the transaction is requested at time t0, the card 300 may collect light data detected starting at 5 minutes before time t0 and send the data to the server 220.

In some examples, the time period may end after the transaction is approved as described in step 425 below or after the transaction is declined as described in step 440 below. The first light sensor 320 may change from an active mode to a standby mode after the time period ends.

In other examples, the time period may end based on the ambient light detected being relatively stable (the change of light has not exceeded a threshold) during a certain amount of time (e.g., 10 minutes). Consistent with FIG. 5A, after time t4, the change of light may be less than a threshold because the light detected may remain low after the card 300 is put back in the wallet or put on a table for a certain amount of time. At such a time point, the light data may no longer be sent in order to save network resources. The first light sensor 320 may change from an active mode to a standby mode after the time period ends. Continuing to receive light data detected during a certain amount of time after the transaction is requested (or even after the transaction is approved) may be useful since light data may be helpful to determine whether the card 300 has been misplaced (e.g., not placed back into a wallet as expected) after the transaction or whether the transaction may need to be otherwise flagged due to a potential irregularity.

Figure 5B:
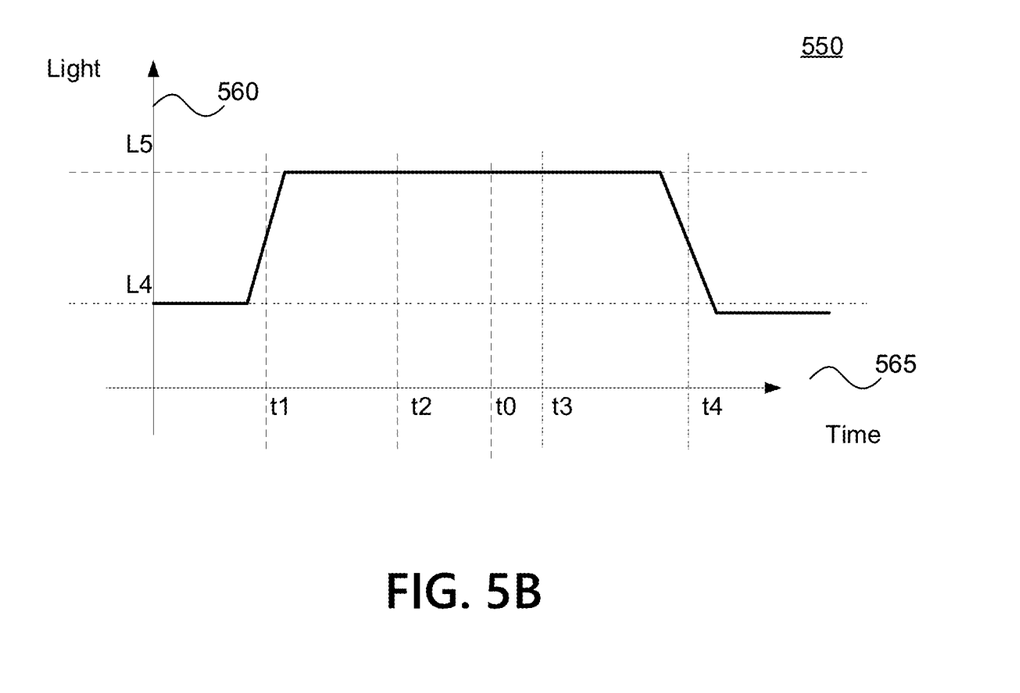

As discussed above, the card 300 may comprise more than one light sensor 320. FIG. 5B shows an example of a graph 550 indicating the light data detected by a second light sensor 320. The second light sensor 320 may be at a location different from the first light sensor 320. Consistent with the example where the transaction type is inserting chip 310 into a chip reader, the second light sensor 320 may be located somewhere relatively far away from chip 310 such that the second light sensor 320 will not be a portion of the chip 310 inserted into the chip reader. In FIG. 5B, the x axis 565 represents the current time, while the y axis 560 represents the amount of light. Consistent with the example in FIG. 5A, before time t1, the card 300 may be in the user's wallet and therefore the amount of ambient light around the second light sensor 320 may be low. As shown in FIG. 5B, the amount of ambient light is L4. At time t1, the user may bring the card 300 out of the wallet to make a payment using the card 300. The amount of ambient light increases, from L4 to L5. L5 may be different from L3 in FIG. 5A, or may be the same with L3 in FIG. 5A. At time t2, the user may insert the chip 310 into a chip reader on the terminal 210. However, since the second light sensor 320 is not inserted into the chip reader, the amount of ambient light that the second light sensor 320 detects may not change as significantly as the amount of ambient light the first light sensor 320 detects. The amount of ambient light may be relatively stable until time t4, when the card 300 is put back in the wallet again.

Similar to the example discussed above, there may be a third light sensor 320 located in the proximity of the magnetic stripe 305, to the extent that the third light sensor 320 may be inserted into the magnetic stripe reader on the terminal 210 while the transaction is requested. There may be a fourth light sensor 320 far away from the magnetic stripe 305, to the extent that the fourth light sensor 320 may be out of the magnetic stripe reader on the terminal 210 while the transaction is requested. If the transaction type is the card 300 being swiped through a magnetic stripe reader on the terminal 210, the light data detected by the third light sensor 320 may be similar to the light data depicted in FIG. 5A, while the light data detected by the fourth light sensor 320 may be similar to the light data depicted in FIG. 5B.

Similarly, there may be a fifth light sensor 320 located on one side of the card 300, and a sixth light sensor 320 located on the other side of the card 300. If the transaction type is the card 300 being presented in close proximity to a contactless payment reader on the terminal 210, the light data detected by the fifth light sensor 320 may be similar to the light data depicted in FIG. 5A, while the light data detected by the sixth light sensor 320 may be similar to the light data depicted in FIG. 5B. One or more of the first, second, third, fourth, fifth, and sixth light sensors may be the same light sensor, and one or more of the first, second, third, fourth, fifth, and sixth light sensors may be different light sensors.

It is appreciated that FIGS. 5A and 5B are just illustrative examples, and the actual light data detected by each of the one or more light sensors 320 may vary. For example, compared with the transaction initiated by reading a chip 310, the coordinate graph reflecting the light data in a transaction initiated by contactless payment may have a relatively gentle slope while the light changes from L3 to L2.

At step 415, the system may determine, based on the transaction type, a model of expected ambient light associated with the transaction type.

The model may indicate the expected ambient light detected by a particular light sensor 320 and show a certain pattern during a certain period. For example, based on the transaction type (e.g., whether the card 300 was presented in close proximity to a contactless payment reader or inserted into a chip reader), the model may indicate the expected ambient light associated with a subset of the one or more of the light sensors 320 (e.g., one of the first, the second and the third light sensors) shows a pattern similar to the pattern depicted in FIG. 5A, and the other subset of the one or more of the light sensors 320 (e.g., one of the fourth, fifth, and sixth light sensors) shows a pattern similar to the pattern depicted in FIG. 5B. In another example, in contactless payment, the time duration between times t2 to t3 may be relatively short (e.g., 10 seconds), while in the chip reader scenario, the time duration between times t2 to t3 may be relatively long (e.g., 1 minute).

The model may indicate a certain range of the amount of light expected at a certain time point or during a certain time period. For example, consistent with FIGS. 5A-5B, the model may indicate the amount of light expected during times t2 to t3 to be in a certain range around L2. The amount of light expected may be determined based on the transaction type (e.g., L2 may be higher during contactless payment than during a chip inserted into a chip reader).

The model may indicate the light spectrum of the expected light data. For example, the light emitted from a screen monitor may comprise a narrower light spectrum than natural light. The system may determine the card 300 is expected to be exposed to light emitted from a display device during a certain time range of the transaction and therefore adjust the model based on the determination. For example, if the terminal 210 comprises a large screen monitor, or if the transaction type is manually inputting the card number into a computer, the card 300 may be expected to be exposed to light emitted from a display device.

The model may indicate expected light corresponding to the conditions during the transaction.

The conditions may comprise the time (e.g., data and/or time of the day) and/or the location of the transaction. In different times and/or locations, the ambient light expected to be detected may be different. For example, the amount of ambient light detected during a time period while the card 300 is exposed to the environment (e.g., from time t1 to t2, or from time t3 to t4, as shown in FIG. 5A) may be different. The model may reflect these differences. For example, if the transaction happens in the daytime, the amount of ambient light during time t1 to t2 (or during time t2 to t3) may be higher. By contrast, if the transaction occurs in the nighttime, the amount of ambient light during that time period may be lower. For another example, the amount of ambient light may vary on a different day depending on the weather (e.g., the amount of light on a sunny day may be higher than the amount of light on a rainy day). For another example, the amount of ambient light in a supermarket may be higher than in a cocktail bar.

The system may obtain information regarding the circumstances of the transaction and may adjust the model based on the information. For example, the date and/or the time of the day may be obtained from the timestamp in the transaction request. The location information may be obtained from an identification (ID) of the terminal 210 and a map between terminal ID and the location of the terminal 210. For example, if the terminal 210 is associated with a merchant, the location may be determined based on the merchant information (e.g., whether the merchant is a bar or a supermarket, the physical location of the merchant).

The conditions may also comprise the habits of the user of the card 300. The model may be based on a data set indicating a habit of a user associated with the card. For example, a first user may tend to put his credit card back in this wallet once the transaction is completed, and therefore the time period between the card 300 being detached from the terminal 210 and put back into a wallet (e.g., time t3 to t4 depicted in FIGS. 5A to 5B) may be relatively short. A second user may tend to carry his credit card in his hand or put it into a plastic bag while walking back home after the purchase is made, and therefore the time period between the card 300 being detached from the terminal 210 and being returned to the light condition of the being put back into a wallet may be relatively long. Based on a user's habit, if the light data associated with a transaction of the first user indicates that the card has been out of the wallet for a long after the first user paid at a supermarket, the transaction may be identified as irregular (even if after the transaction has been initially approved) because the card 300 may be lost or misplaced. By contrast, if the light data associated with a transaction of the second user indicates that the card 300 has been out of the wallet for a long while after the second user paid at a supermarket, the transaction will not be identified as irregular as quickly because the card 300 may be placed in a plastic bag or being carried by the user. The data set indicating a habit of a user associated with the card 300 may be obtained by the system from prior transactions and light data associated with prior transactions associated with the user.

At step 420, the system may determine whether the light data corresponds to the model. If the light data corresponds to the model, the method may proceed to step 425. If the light data does not correspond to the model, the method may proceed to step 430 and send a confirmation request to the user's mobile device 225.

The system may compare the light data with the model and determine whether the light data and the model match by determining how much the light data deviate from the model.

The system may determine the similarity between the amount of light in the light data and the model over a period of time (e.g., from time t1 to time t4 consistent with the example in FIGS. 5A-5B). If the similarity between the light data and the model during the period of time reaches or exceeds a threshold, the system may determine the light data and the model match. The similarity may be determined in the time domain, or may be m in another domain (e.g., in the frequency domain). For example, a time-domain analysis may be performed by calculating the normalized cross-correlation of the light signal in the light data and the model. For example, a frequency-domain analysis may be performed by measuring the root mean square error after converting the light data from the time domain to the frequency domain by a Fourier transform (e.g., a Fast Fourier Transform). It will be appreciated that various ways to determine similarity may be applied herein and will be apparent to a person having ordinary skill in the art with the benefit of this disclosure.

In the example where more than one light sensor is used, the determination may comprise determining an amount of light detected by a first light sensor 320 associated with a first portion of the card 300 at a time based on the timestamp (e.g., at time t0 as depicted in FIGS. 5A-5B), and determining an amount of light detected by a second light sensor 320 associated with a second portion of the card 300 at the time based on the timestamp. If a difference between the amount of light detected by the first light sensor 320 and the amount of light detected by the second light sensor 320 (e.g., the difference between L2 and L4 at time t0, as depicted in FIGS. 5A-5B) exceeds a threshold, it may be determined the light data matches the model.

At step 425, the system may send, based on the determination that the light data corresponds to the model, an approval of the request. The approval may be sent internally either to a computing component of the server 220, to the terminal 210, or to another independent computing device configured to process the transaction. For example, if the transaction is to make a payment from a user's bank account, the approval may be sent to a computing device configured to process the bank account data so that based on the approval, the amount of money may be deducted from the user's bank account to the merchant associated with the terminal 210. For another example, if the transaction is to open a lock on a door that is controlled by the terminal 210, the approval may be sent to the terminal 210.

At step 430, the system may send, based on the determination that the light data does not correspond to the model, a request for the card owner to confirm the transaction before approving the transaction. The request may be sent to the mobile device 225 associated with the user of the card 300 via an application (e.g., financial institution of card, text message) on the mobile device 225. The card owner may either confirm or decline the transaction based on the request.

At step 435, the system may determine whether a confirmation is received. If a confirmation is received, the method may proceed to step 425. If a confirmation is not received during a certain time period after the request was sent, the method may proceed to step 440 and decline the transaction request.

At step 445, the system may update a training data set by adding the light data obtained at step 410 to the training data set. The training data set may be obtained from a database and may comprise a plurality of training light data associated with prior transactions of the transaction type.

The training data set may also indicate whether the transaction associated with each training light data is approved. For example, if step 445 is performed after step 425, the newly added training data may comprise an indication that the transaction is approved. If step 445 is performed after step 440, the newly added training data may comprise an indication that the transaction is declined.

The training data set may also indicate whether the transaction is later identified as an irregularity after the transaction is approved or declined. For example, if after a transaction of money transferring is approved, the user of the card 300 reaches out to the bank to claim that the approved transaction is fraudulent, the training data set may also comprise an indication that the transaction should have been declined.

At step 450, the system may update the model based on the updated training data set. For example, the system may input the updated training data set into a neural network (e.g., a convolutional neural network) to update the model.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for evaluating a card transaction for fraud comprising:
   receiving, by a computing device and from a transaction terminal, a request to approve a transaction, wherein the request comprises a timestamp corresponding to a time when the transaction was requested, a transaction type associated with the transaction, and an identification of a card associated with the transaction;
   receiving, after receiving the request to approve the transaction, from one or more light sensors disposed on the card via a mobile device associated with a user of the card and in communication with the card, light data, wherein the light data indicates an amount of ambient light, which is detected by the one or more light sensors, during a time period comprising the time when the transaction was requested;
   determining, by the computing device and based on the transaction type, a model of ambient light, associated with the transaction type, expected during the time period;
   determining, by the computing device, that the light data, received from the one or more light sensors disposed on the card via the mobile device, corresponds to the model; and
   sending, based on the determining that the light data corresponds to the model, an approval of the request.

2. The method of claim 1, wherein determining that the light data corresponds to the model comprises:
   determining an amount of light detected by a first light sensor associated with a first portion of the card at a time based on the timestamp; and
   determining an amount of light detected by a second light sensor associated with a second portion of the card at the time based on the timestamp,
   wherein a difference between the amount of light detected by the first light sensor and the amount of light detected by the second light sensor exceeds a threshold.

3. The method of claim 2, wherein the transaction terminal is a contactless payment terminal, and wherein the first light sensor and the second light sensor detect light on opposite sides of the card.

4. The method of claim 1, wherein the time period starts based on a change of light exceeding a threshold.

5. The method of claim 1, wherein the transaction type associated with the transaction comprises one of:
   the card being presented in close proximity to a contactless payment reader on the transaction terminal;
   the card being swiped through a magnetic stripe reader on the transaction terminal; or
   a portion of the card being inserted into a chip reader on the transaction terminal.

6. The method of claim 1, wherein the light data further indicates a change of ambient light over the time period.

7. The method of claim 1, wherein the determining that the light data corresponds to the model comprises:
   determining the card was exposed to light emitted from a display device at a time based on the timestamp.

8. The method of claim 1, wherein the determining the model is further based on a location of the transaction terminal.

9. The method of claim 1, wherein the determining the model is further based on the timestamp.

10. The method of claim 1, wherein the determining the model is further based on a data set indicating a habit of a user associated with the card.

11. The method of claim 1, further comprising:
    obtaining, from a database, a training data set comprising a plurality of training light data associated with prior transactions of the transaction type;
    updating the training data set by adding the light data to the training data set; and
    updating the model based on the updated training data set.

12. A computing device comprising:
    one or more processors; and
    memory configured to store computer instructions that, when executed by the one or more processors, cause the computing device to perform actions comprising:
      receiving, from a transaction terminal, a request to approve a transaction, wherein the request comprises a timestamp corresponding to a time when the transaction was requested, a transaction type associated with the transaction, and an identification of a card associated with the transaction;
      receiving, after receiving the request to approve the transaction, from one or more light sensors disposed on the card via a mobile device associated with a user of the card and in communication with the card, light data, wherein the light data indicates an amount of ambient light, which is detected by the one or more light sensors, during a time period comprising the time when the transaction was requested;
      determining, based on the transaction type, a model of ambient light, associated with the transaction type, expected during the time period;
      determining that the light data, received from the one or more light sensors disposed on the card via the mobile device, corresponds to the model;
      sending, based on the determining that the light data corresponds to the model, an approval of the request;
      obtaining, from a database, a training data set comprising a plurality of training light data associated with prior transactions of the transaction type;
      updating the training data set by adding the light data to the training data set; and
      updating the model based on the updated training data set.

13. The computing device of claim 12, wherein the computer instructions are configured to cause the computing device to determine that the light data corresponds to the model by performing actions comprising:

determining an amount of light detected by a first light sensor associated with a first portion of the card at a time based on the timestamp; and determining an amount of light detected by a second light sensor associated with a second portion of the card at the time based on the timestamp, wherein a difference between the amount of light detected by the first light sensor and the amount of light detected by the second light sensor exceeds a threshold.

14. The computing device of claim 13, wherein the transaction terminal is a contactless payment terminal, and wherein the first light sensor and the second light sensor detect light on opposite sides of the card.

15. The computing device of claim 12, wherein the time period starts based on a change of light exceeding a threshold.

16. The computing device of claim 12, wherein the transaction type associated with the transaction comprises one of:
the card being in close proximity to a contactless payment reader on the transaction terminal;
the card being swiped through a magnetic stripe card reader on the transaction terminal; or
a portion of the card being inserted into a chip reader on the transaction terminal.

17. A non-transitory computer-readable medium storing computer instructions that, when executed by one or more processors, cause performance of actions comprising:
receiving, from a transaction terminal, a request to approve a transaction, wherein the request comprises a timestamp corresponding to a time when the transaction was requested, a transaction type associated with the transaction, and an identification of a card associated with the transaction;
receiving, after receiving the request to approve the transaction, from one or more light sensors disposed on the card via a mobile device associated with a user of the card and in communication with the card, light data, wherein the light data indicates an amount of ambient light, which is detected by the one or more light sensors, during a time period comprising the time when the transaction was requested, wherein the one or more light sensors comprises a first light sensor associated with a first portion of the card and a second light sensor associated with a second portion of the card;
determining, based on the transaction type, a model of ambient light, associated with the transaction type, expected during the time period;
determining whether the light data corresponds to the model based on:
determining an amount of light detected by the first light sensor at a time based on the timestamp; and
determining an amount of light detected by the second light sensor at the time based on the timestamp,
wherein a difference between the amount of light detected by the first light sensor and the amount of light detected by the second light sensor exceeds a threshold;
declining, based on determining that the light data does not correspond to the model, the request; and
sending, based on determining that the light data corresponds to the model, an approval of the request.

18. The non-transitory computer-readable medium of claim 17, wherein the computer instructions are further configured to cause performance of actions comprising:
obtaining, from a database, a training data set comprising a plurality of training light data associated with prior transactions of the transaction type;
updating the training data set by adding the light data to the training data set; and
updating the model based on the updated training data set.

19. The non-transitory computer-readable medium of claim 17, wherein the transaction terminal is a contactless payment terminal, and wherein the first light sensor and the second light sensor detect light on opposite sides of the card.

20. The non-transitory computer-readable medium of claim 17, wherein the transaction type associated with the transaction comprises one of:
the card being in close proximity to a contactless payment reader on the transaction terminal;
the card being swiped through a magnetic stripe card reader on the transaction terminal; or
a portion of the card being inserted into a chip reader on the transaction terminal.

* * * * *